(No Model.)
T. J. CHRISTY.
WASHING MACHINE.
No. 363,046. Patented May 17, 1887.
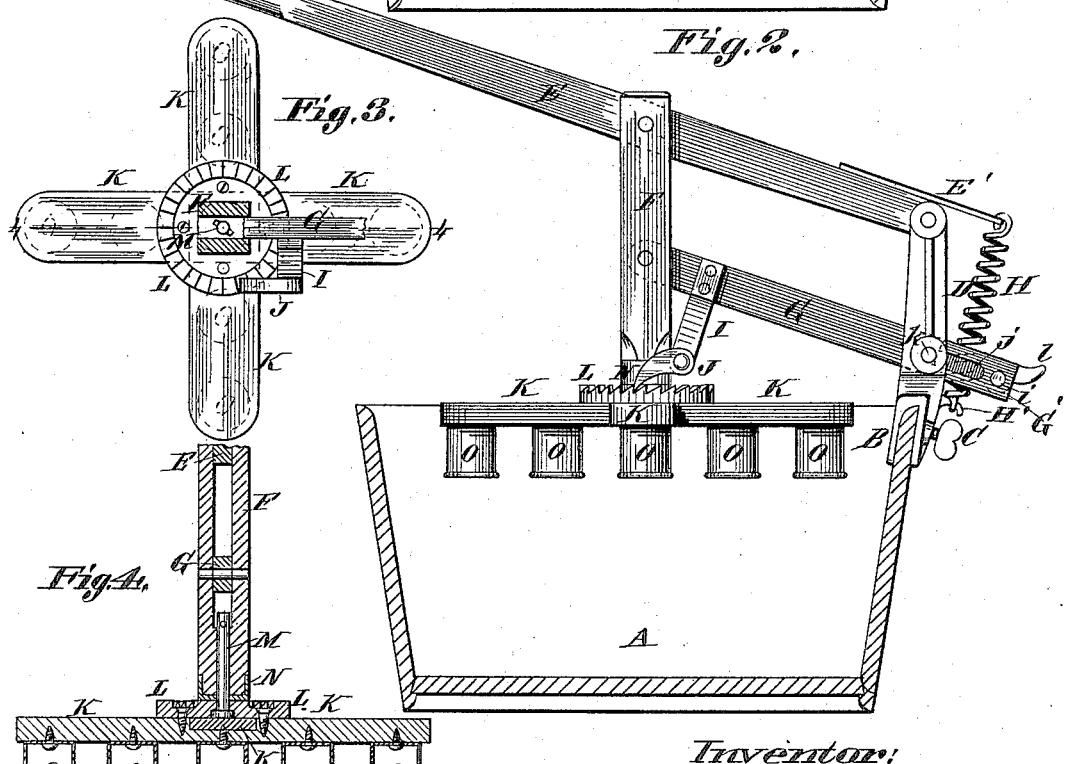
Inventor:
Thomas J. Christy
Attest:
G. S. Hinchman Jr.
Charles Pickle

UNITED STATES PATENT OFFICE.

THOMAS J. CHRISTY, OF ST. LOUIS, MISSOURI.

WASHING-MACHINE.

SPECIFICATION forming part of Letters Patent No. 363,046, dated May 17, 1887.

Application filed December 28, 1886. Serial No. 222,759. (No model.)

*To all whom it may concern:*

Be it known that I, THOMAS J. CHRISTY, residing in the city of St. Louis, Missouri, have invented certain new and useful Improvements in Washing-Machines, of which the following is a full, clear, and exact description, reference being had to the accompanying drawings, forming part of this specification.

My invention relates to a metal cup-plunger. The detail construction and advantages of my improvements will be more fully understood and explained by referring to the drawings.

Figure 1 is a section of tub with machine attached and lever down; Fig. 2, the same as Fig. 1, with lever up; Fig. 3, a horizontal section on line 3 3 of Fig. 1; Fig. 4, a vertical section on line 4 4 of Fig. 3; Fig. 5, a detail section of bracket or standard D, showing manner of disengaging dog.

Similar letters refer to similar parts throughout the several views.

The standard D is secured to the side of tub A by clamp B and set-screw C, which is made of malleable casting, but may be made of wood, if desired, and extended to a base or stool below the tub. Bolt M passes through ratchet-wheel L L and ferrule N into bar F, and is secured by a key being driven through end of the bolt. The ratchet-wheel L L is secured to cross-bars K K by screws, and revolves on bolt M when the lever E is worked up and down by means of ratchet-dog J, operating as shown in Figs. 1 and 2. The cups *o o* are made of zinc and secured to cross-bars K K by screws, as shown. The link G keeps the plunger and bar F always working in a true and upright position and makes the ratchet perfect in its operation.

When it is desired to raise the plunger up out of the tub, press on thumb-piece *l* of dog *j* and turn same as shown in Fig. 5. Then by raising lever E the link G passes forward to end of slot *g*, as shown, which allows the plunger to be lifted to such a height as required to be entirely out of the way while putting in and taking out clothing; and when it is lowered back into the tub, link G passes back until the pin *k* reaches the recess *h*. Then the dog *j* is shut down and locks the pin *k* in recess *h*, as shown in Figs. 1 and 2. It will be seen that when the lever E is raised to the position as shown in Fig. 2 the ratchet-dog J pushes the ratchet L L forward two or three notches, and when lowered to position, as shown in Fig. 1, falls back and thus revolves the plunger at each stroke of the lever a notch or two, according to the length of stroke. The ratchet-dog J may be extended and pivoted to the standard D, near the top, and thus do away with the arm I, if desired. The extension-bar E' of lever E is extended to such distance as will give the spring H the desired power necessary to overcome the suction caused by the cups *o o* on the upward stroke of the lever.

Having thus described my invention, what I claim as new, and desire to secure by Letters Patent, is—

The link G, having slot *g*, dog *j*, pivoted with thumb-piece *l*, and pin *i*, in combination with standard D, bar F, lever E, ratchet-wheel L L, bolt M, ratchet-dog J, cross-bars K K, and cups *o o*, for the purposes set forth and described.

THOMAS J. CHRISTY.

Witnesses:
A. E. CHRISTY,
GEORGE FORBY.